(12) United States Patent
George

(10) Patent No.: US 8,706,498 B2
(45) Date of Patent: Apr. 22, 2014

(54) SYSTEM FOR DYNAMIC MANAGEMENT OF CUSTOMER DIRECTION DURING LIVE INTERACTION

(75) Inventor: Alex K. George, Tampa, FL (US)

(73) Assignee: Astute, Inc., Columbus, OH (US)

( * ) Notice: Subject to any disclaimer, the term of this patent is extended or adjusted under 35 U.S.C. 154(b) by 1396 days.

(21) Appl. No.: 12/032,338

(22) Filed: Feb. 15, 2008

(65) Prior Publication Data

US 2009/0210228 A1   Aug. 20, 2009

(51) Int. Cl.
*H04M 3/00* (2006.01)
*G10L 15/22* (2006.01)

(52) U.S. Cl.
USPC ............... 704/270; 379/265.01; 379/265.06; 379/265.09; 704/251

(58) Field of Classification Search
USPC ........................... 379/265.06; 704/270, 270.1
See application file for complete search history.

(56) References Cited

U.S. PATENT DOCUMENTS

| | | | | |
|---|---|---|---|---|
| 5,243,642 A * | 9/1993 | Wise et al. | | 379/82 |
| 6,320,948 B1 * | 11/2001 | Heilmann et al. | | 379/189 |
| 6,542,602 B1 * | 4/2003 | Elazar | | 379/265.06 |
| 6,819,759 B1 * | 11/2004 | Khuc et al. | | 379/309 |
| 6,868,154 B1 * | 3/2005 | Stuart et al. | | 379/265.06 |
| 6,970,821 B1 * | 11/2005 | Shambaugh et al. | | 704/270 |
| 7,076,427 B2 * | 7/2006 | Scarano et al. | | 704/270 |
| 7,596,498 B2 * | 9/2009 | Basu et al. | | 704/270 |
| 2002/0073206 A1 * | 6/2002 | Jawahar et al. | | 709/227 |
| 2004/0008828 A1 * | 1/2004 | Coles et al. | | 379/88.01 |
| 2004/0029564 A1 * | 2/2004 | Hodge | | 455/411 |
| 2004/0117185 A1 * | 6/2004 | Scarano et al. | | 704/254 |
| 2005/0010411 A1 * | 1/2005 | Rigazio et al. | | 704/246 |
| 2005/0053224 A1 * | 3/2005 | Pennington et al. | | 379/265.09 |
| 2005/0149418 A1 * | 7/2005 | Erbey et al. | | 705/35 |
| 2005/0216269 A1 * | 9/2005 | Scahill et al. | | 704/270.1 |
| 2006/0080664 A1 * | 4/2006 | Jawahar et al. | | 718/100 |
| 2006/0190422 A1 * | 8/2006 | Beale et al. | | 707/1 |
| 2006/0233347 A1 * | 10/2006 | Tong et al. | | 379/265.06 |
| 2007/0011008 A1 * | 1/2007 | Scarano et al. | | 704/254 |
| 2007/0133780 A1 * | 6/2007 | Berner et al. | | 379/265.01 |
| 2007/0201678 A1 * | 8/2007 | Marquette et al. | | 379/265.01 |

\* cited by examiner

*Primary Examiner* — Jialong He
(74) *Attorney, Agent, or Firm* — Porter Wright Morris & Arthur LLP

(57) ABSTRACT

A system for customer interaction includes a telephony-enabled device for receiving voice calls from customers, a voice recognition engine connected to the telephony-enabled device for monitoring the voice channel, and an application server connected to the voice recognition engine for receiving notification when specific keywords phrases or tones are detected. The system is characterized in that the application server selects scripts for presentation to the customer based at least in part on the notifications received from the voice recognition engine.

6 Claims, 5 Drawing Sheets

SYSTEM FOR DYNAMIC MANAGEMENT OF CUSTOMER DIRECTION DURING LIVE INTERACTION

BACKGROUND OF THE INVENTION

1. Field of the Invention

The present invention is in the field of customer relations management and pertains more particularly to a system and method for managing customer experience during live interaction based on perceived and established need.

2. Discussion of the State of the Art

Customer service is the art of relating to customers in business. Many enterprises have learned that in order for expansion to be meaningful in terms of revenue increases and profitability, customer-centric business practices must be adopted. Customer-centric business practices attempt to improve the experience of a customer by first identifying and rectifying any problems or issues that might be affecting the business-to-customer relationship, and then by providing state of art services to the customer in ways that best improve the experience of the customer.

Customer experience is key to customer retention in many businesses. High quality of service and timely rectification of problems, mistakes, and misunderstandings can lead to highly satisfied customers who will contribute much more revenue that dissatisfied customers. The most common enterprise condition that generally leads to chronic customer dissatisfaction is company indifference. Once a customer is unhappy, they may not indicate their dissatisfaction. In many cases they just stop doing business with the company. They also tend to tell their experience to other potential customers, which can be an undesirable side effect of company indifference or neglect.

It has occurred to many companies that the customer experience can be improved by an enterprise if the customer experience can be captured and reviewed to see, for example, what may have transpired that produced a positive result or a negative result as the case may be. Therefore it is commonplace for a company doing business with customers to monitor calls in a call center environment to determine quality of service to the customer. In many cases only a percentage of calls are monitored, typically by a live person such as a supervisor. The human operator is then responsible for recording the result of the calls he or she is charged with monitoring.

Generally speaking, in a call center it is common for call result data to be gathered at some later point in time after interaction has occurred. The data can be analyzed in the context of the customer experience to try and determine common weaknesses in customer service, agent training, policy, and so on so that improvements may then be designed and implemented for future interaction, hopefully improving future experiences of the customer.

Companies often overlook how a customer is actually getting along exactly at the time of interaction with a live agent. The live attendant is focused generally on a specific goal related to the call and may not be particularly perceptive to what the customer may be experiencing.

Therefore, what is clearly needed in the art is a system that monitors the experience of the customer during live interaction, recognizing specific conditions or states of the customer, and using the information to alter agent scripting on the fly to achieve a better experience for the customer.

SUMMARY OF THE INVENTION

The problem stated above is that pre-knowledge of what the customer wants or needs is desirable for an enterprise selling products and/or services, but many of the conventional means for determining customer needs and wants, such as customer prompting by IVR or even live interaction sometimes fails to determine what the customer may really want at the time the customer wants it. Therefore, the customer experience with the contact center is most critical. The inventors therefore considered functional elements of a contact center customer service system looking for elements that might enable a better or at least a more timely determination of what is really in the customers mind during interaction.

Every contact center sales force or team is or should be motivated by internal direction to attempt to increase sales and generate more revenue through smart customer service or "improving the customer experience". Most contact centers employ previous customer knowledge and customer responses to IVR prompting to determine what the customer is looking for. Sometimes what is on the mind of the customer is not clearly expressed to a system or an agent during interaction and the customer experience can be tarnished by neglecting or failing to perceive the needs of the customer, which may extend beyond typical options presented in a structured or focused manner.

The present inventor realized in an inventive moment that if, at the point of interaction with a customer, the real needs and motivation of the customer could be more accurately perceived, opportunities might be better presented to the customer in a timely and more personalized manner such that significant improvement of the customer experience might result. The inventor therefore constructed a unique customer voice monitoring and opportunity presentation system that allowed agents to present more personalized offers to customers when customers showed motivation toward those offers and to quickly correct negative customer issues at the time that the customer needed or desired the corrections. Significant improvement in customer experience results by using the system, with less frustration with contact center services.

Accordingly, the inventors provide a system for customer interaction. The system includes a telephony-enabled device for receiving voice calls from customers, a voice recognition engine connected to the telephony-enabled device for monitoring the voice channel, and an application server connected to the voice recognition engine for receiving notification when specific keywords phrases or tones are detected. A characterization of the system is that the application server selects scripts based at least in part on the notifications received from the voice recognition engine.

According to another aspect of the invention, a method is provided for selecting from a pool of pre-written scripts a script to send to an agent interacting with a customer. The method includes steps (a) providing a grammar library of keywords and/or phrases, a scale defining voice tone levels, and pre-written scripts, (b) associating one or more of the keywords and/or phrases to individual ones of the scripts, (c) monitoring the voice channel using voice recognition, (d) recognizing one or more keywords and/or phrases spoken, or a voice tone level, and (e) selecting a script and serving the script to the agent based at least in part on the results of step (d) weighed against one or more rules.

According to another embodiment, a system for altering a generic script served to an agent during live interaction with a customer is provided. The system includes a telephony-enabled device for receiving voice calls from customers, a voice recognition engine connected to the telephony-enabled device for monitoring the voice channel, and an application server connected to the voice recognition engine for receiving notification when specific keywords phrases or tones are detected. A characterization of the system is that the application server selects and serves descriptive text related to a product or service into the existing script based at least in part on the notifications received from the voice recognition engine.

According to another embodiment, a system for alerting a supervisor to monitor a voice interaction between an agent and a customer. The system includes a telephony-enabled device for receiving voice calls from customers, a voice recognition engine connected to the telephony-enabled device for monitoring the voice channel, and an application server connected to the voice recognition engine for receiving notification when specific keywords phrases or tones are detected. The system is characterized in that the application server serves an alert to monitor the call to a supervisor based at least in part on the notifications received from the voice recognition engine.

According to another aspect of the invention, a method for determining when to send notification to a supervisor to monitor a live interaction between an agent and a customer. The method includes steps (a) providing a grammar library of keywords and/or phrases and a scale defining voice tone levels, (b) associating one or more of the voice tone levels, keywords, and/or phrases to a notification event to monitor an interaction, (c) monitoring the voice channel using voice recognition, (d) recognizing one or more keywords and/or phrases spoken, or a voice tone level, and (e) sending notification to monitor the interaction based at least in part on the results of step (d) weighed against one or more rules.

BRIEF DESCRIPTION OF THE DRAWING FIGURES

DETAILED DESCRIPTION

The inventors provide a system for selecting and sending scripts to an agent during live voice interaction with a customer based on recognition of voice tone level, or one or more keywords and/or phrases and enterprise rules governing which scripts to send. The system, known to the inventor as a contact center voice solution (CVS) system and methods for practicing the invention are described in enabling detail in various embodiments below.

Figure 1:
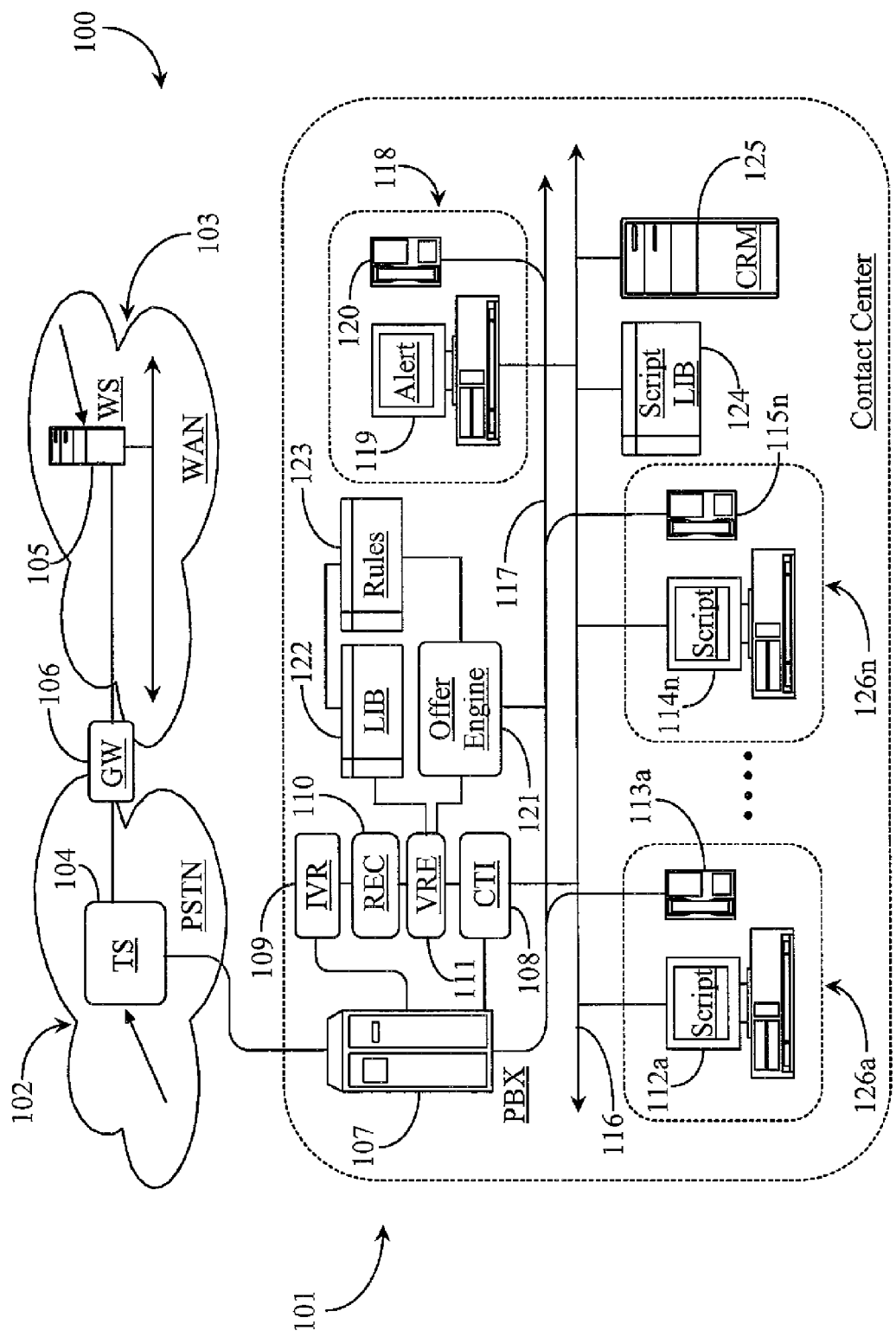
FIG. 1 is an architectural view of a communications network 100 supporting dynamic management of customer direction during interaction according to an embodiment of the present invention.

FIG. 1 is an architectural view of a communications network 100 supporting dynamic management of customer direction during interaction according to an embodiment of the present invention. Communications network 100 includes a contact center 101 adapted for servicing customers contacting the center from a wide area network (WAN) 103 or from a telephone network such as a public switched telephone network (PSTN) 102.

WAN 103 may be a private network such as a corporate WAN, Intranet, or Ethernet. Network 103 may be the well known Internet or a municipal area network (MAN). In a preferred example, WAN 103 is the Internet network because of high public access characteristic and geographic reach. WAN 103 may also be referred to hereinafter as Internet 103.

PSTN 102 may also be a private telephone network, a wireless loop, or some other wireless telephone network either digital or analog. In a preferred example the PSTN is represented because of a high public access characteristic and its geographic reach. In various embodiments, communications network 100 may include other digital communications network segments not illustrated here without departing from the spirit and scope of the present invention.

PSTN 102 includes a telephone switch (TS) 104 connected by telephone trunk to a privet branch exchange (PBX) central switch 107 located within contact center 101. PBX 107 may be another type of telephone switch without departing from the spirit and scope of the present invention. Any switch capable of processing incoming telephone calls may be used instead. Calls destined for contact center 101 sourced from PSTN 102 are illustrated entering TS 104 as a directional arrow leading into TS 104.

Internet 103 includes a backbone illustrated herein by a double arrow, which represents all of the connection lines access points and equipment that make up the Internet network as a whole. Therefore, there are no geographic limitations to the practice of the present invention. Internet 103 includes a Web server (WS) 105 adapted to host and serve electronic information pages known as Web pages in the art. Contact center 101 may provide a Web site of one or more Web pages to be hosted on WS 105. Customers may initiate a voice call to contact center 101 by navigating WS 105 to the contact center Web site contact page, for example, and clicking on an action button to call the center. Customers reaching center 101 in this manner are illustrated herein by a directional arrow leading into WS 105. Calls sourced from Internet 103 may be transferred between the two networks through a network gateway 106 such as an SS-7 gateway or one of another known type.

In one embodiment, TS 104 connected to PBX 107 could instead of a local telephone switch, be a gateway connected to a central office switch or a Signal Switching Point (SSP) in the intelligent network, which may be connected to an IP soft switch instead of a PBX without departing from the spirit and scope of the present invention.

In this example, center 101 receives calls for internal routing at PBX 107. PBX 107 is computer telephony integrated (CTI) via a CTI server 108 connected to the switch via a CTI link. CTI server 108 provides routing control, call processing control, and other computer-based intelligence to switch 108 as is generally known in CTI environments. Callers waiting for internal routing at switch 107 are greeted by an interactive voice response (IVR) system 109. IVR 109 is adapted to interact with the callers using synthesized prerecorded voice prompting to determine information from the caller such as reason for the call, and so on. Information retrieved from callers by IVR 109 may be used to aid call routing within center 101. IVR 109 is connected to switch 107 this example by way of telephone trunk. In one embodiment, IVR 109 may be a CTI function running on CTI server 108. The installation illustrated here is logical only.

In addition to IVR 109 there are two other intelligent peripherals provided, which have access to and operate in conjunction with IVR 109. These are a call recording system (REC) 110 and a voice recognition engine (VRE) 111. REC 110 and VRE 111 may be off-the-shelf products that may be adapted to practice the present invention with little modification.

CTI server 108 has a connection to a local area network (LAN) 116 provided within center 101 for interconnecting agents and systems for communication and for enabling access to contact center data used in center operations. LAN 116 supports agent communications stations 126a through 126n. Agent station 126a includes an agent computing system 112a and an agent telephone 113a. Agent station 126n is similarly adapted for communication with computing appliance 114n and agent telephone 115n.

Agent computers 112a and 114n may be agent desktop computers connected directly to LAN 116. Appliances 112a and 114n may also be laptop computers connected to LAN 116 wirelessly. LAN 116 may also be a wireless LAN. There are various configurations that are possible. In this example agent telephones 113a and 115n are connected directly to PBX 107 via internal telephone wiring 117. Telephones 113a and 115n may be IP telephones in one example.

An agent station 118 is illustrated herein and is supported by LAN 116. Agent station 118 is, in this example, reserved for an agent supervisor or manager having authority over agents operating stations 126a-126n. Station 118 includes a computing appliance 119 connected directly to LAN 116 and an agent telephone 120 connected directly to PBX 107 via wiring 117. In general operations in communication, a supervisor working from station 118 may monitor any other station such as stations 126a-126n at the discretion of the supervisor. Typically, contact center software is running within the center and a central personnel accounting system is active and agents logged into the system are actively working in the center to handle communication and other tasks related to customer servicing.

VRE 111 has data access to a grammar library (LIB) 122 that contains specific grammar such as specific keywords and phrasing related to contact center business. LIB 122 is associated to a rules base (Rules) 123. A unique offer engine 121 is provided in this example and has direct connection to LAN 116 and has access to rules base 123 and access to VRE 111. Offer engine 121 is adapted, in one embodiment, as an application server and may be enabled to select a pre-written script based on a trigger event from VRE 111. Such a trigger event may be that VRE detects a spoken keyword one or a number of times or phrase or a combination thereof uttered by a customer engaged in live interaction with an agent such as one operating at station 126a, for example.

Offer engine 121 may consult rules database 123 after receiving a trigger event to determine based on rule, which of a pool of pre-written scripts to select for service. Offer engine 121 is also adapted, in this example, as a server and has the ability to serve a selected script to an agent desktop such as to computer 112a service thereof illustrated herein by the word script. The script is served to the agent while the live interaction with the customer is occurring. Offer engine 121 can handle multiple simultaneous live interactions and can select and serve scripts simultaneously to all agents working in center 101. Offer engine 121 receives events from VRE 111, the events detailing the line and identities of the agent and the customer and the network address of the agent computer that will receive scripts.

In one embodiment all live interactions are recorded as soon as the IVR takes the call and begins interaction with a customer before the customer is routed to a final destination. VRE 111 may process those recordings in near real time or as the recording takes place. Voice recognition as well as voice-to-text transcription for records may be part of the real time or near real time process.

VRE 111 may generate several trigger events during a single live interaction. Those events are processed by offer engine 121 against one or more rules in rules base 123 to determine which scripts to serve and when a script will be served. Scripts may appear on the agent desktop screen as a pop-up text window, or some other visual notification. Scripts may identify the customer and line the customer is connected to in case the agent has more than one customer in interaction at a given time. In one embodiment, the script is delivered to the agent as suggested text and the agent may read the script to the customer. In another embodiment, the script may be played for the customer in a synthesized voice using IVR 109 and the customer may then interact with the script by responding to prompts associated with the script.

In one embodiment, VRE 111 is adapted to detect one or more mood states of a customer defined by one or more voice tone levels. In this case, a script may be selected and served according to a trigger event from VRE 111 that identifies a specific mood state such as "agitated". The script served might be one that the agent may use to soothe the customer before engaging in any further business. A specific mood state identified by a voice tone level may also trigger offer engine 121 to notify or alert a supervisor such as one operating at station 118. The alert or notification may identify the agent and customer and may include a text note such as monitor requested or intervention requested on this call. The alert may include a number the supervisor may dial to patch into the call. In the case of IP connection, the supervisor may intervene and monitor the call directly from the computer station if enabled for IP telephony.

In this example, rules base 123 contains both rules that govern what constitutes a "trigger event" for VRE 111 and rules that govern what scripts to serve based on the trigger event. In one embodiment, one trigger event may not necessarily result in a script being served. More than one of a same trigger event may be required before a script is served to the agent. For example, a rule in rules base 123 may require that the customer speak a key word or phrase or a combination thereof a number of times during the interaction before a script is served. Scripts may be upsell opportunities, cross sell opportunities or some other script associated with a trigger event.

Offer engine 121 may retrieve scripts for service from a script library (Script LIB) repository 124 connected to LAN 116. In a preferred embodiment scripts are served to the agent during the live interaction. However, in another embodiment agents may have scripts suggested to them by offer engine 121 and they may pull those scripts from repository 124.

In one embodiment of the present invention offer engine 121 has the capability of altering a script by inserting text into the script, overwriting text that was in the same place in the script. In this embodiment, script library 124 may contain keywords and phrases that define products, services and the benefits of those including pricing, information and delivery terms. A script for offering a product or service may be a template within which there are text placeholders describing the product/service name, the product/service benefits, and the product/service pricing and delivery information. In this case a generic opportunity script may be served describing a particular product or service and that script may be altered in place on the agent desktop based on trigger event from VRE 111. Offer engine 121 may select the appropriate keywords and phrasing to insert into the script template based on trigger event and the inserted text appears in the script at the time of service and the agent may then relay the new information to the customer.

It is important to many customer contact centers that any past issues or problems a customer may have are e resolved before new opportunities are presented to the customer. Therefore, a customer relations management (CRM) server 125 is provided connected to LAN 116 that is adapted to serve any relevant information to an agent that may be known about the customer at the time of the live interaction. For example, a customer may call the center to make a purchase or sign up for a new service but may still owe on some prior product or service, or may have some unresolved past issue. In such cases, VRE 111 may be suspended until the past business is resolved before monitoring the customer for scripting service.

In one embodiment, offer engine 121 is adapted to check CRM 125 at the onset of IVR interaction with a customer before final destination routing. If the customer has any past issues that need resolution before any new business can be conducted with the customer, the agent may be alerted to that fact and no offers are presented until the past issue is successfully resolved.

VRE 111 may be adapted in one embodiment to "listen" to a result of an opportunity offered to a customer through a served script and if the opportunity fails (customer declines), may serve a follow up script that is a subsequent offer, perhaps more comfortable to the customer. Therefore, a chain of subsequent scripts may be automatically served based on one trigger event and a negative result following each script presentation to the customer by the agent. A logical application might be a drop-close situation where the first script offers the opportunity at a specific pricing and wherein subsequent scripts offer lesser priced versions of the same service package. Center wide statistics may be collected on scripted opportunity presentation results. Those statistics may be analyzed to fine tune scripting and adjust VRE recognition for other key words and phrasing. There are many possibilities.

Figure 2:
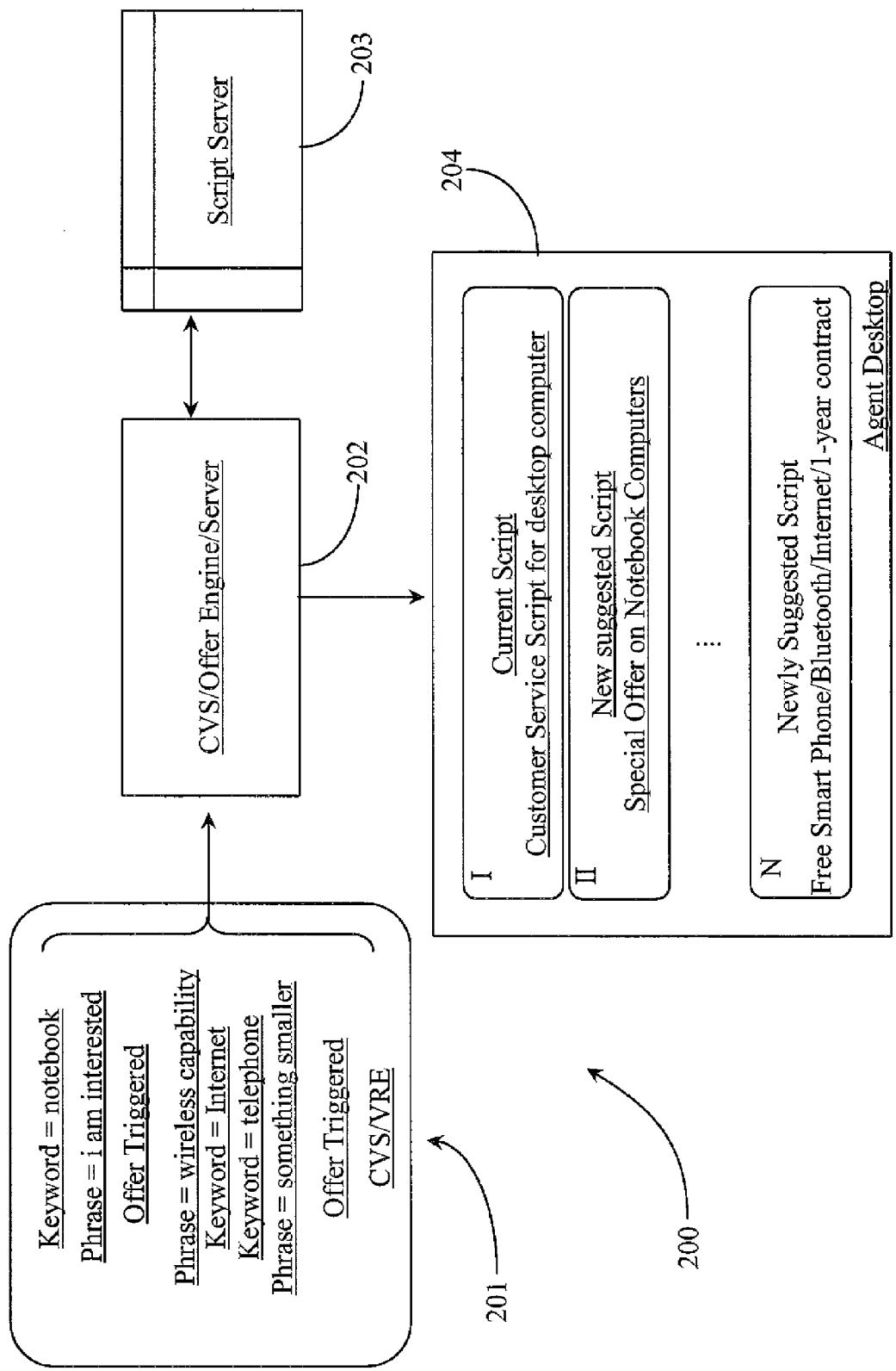
FIG. 2 is a block diagram illustrating agent scripting based on keyword and/or phrase recognition according to an embodiment of the present invention.

FIG. 2 is a block diagram illustrating agent scripting based on keyword and/or phrase recognition according to an embodiment of the present invention. A contact center voice solution (CVS) system 200 is illustrated in this example and includes a CVS/voice recognition engine (VRE) 201, which may be analogous to VRE 111 described in FIG. 1. A voice recording system is not illustrated in this example, but may be present. VRE 201 may be adapted to process both live voice and recorded voice without departing from the spirit and scope of the invention. That is to say that a recording of the conversation that is accessible after the conversation is not absolutely necessary to practice the invention.

A CVS offer engine and server 202 is provided and may be analogous to offer engine 121 of FIG. 1. Offer engine 202 receives trigger events directly from VRE 201. A rules base and grammar library are not illustrated in this example, but may be assumed present for VRE function and offer engine script selection. In this example, offer engine 202 requests and receives scripts from a separate script server 203 and then forwards those scripts to the appropriate agent desktop illustrated herein as agent desktop 204.

In one embodiment, offer engine 202 may send a command to script server 203 identifying the appropriate script to server and the LAN address of the desktop to serve the script to. In that case, the script server serves the scripts directly to agents over the LAN. In still another embodiment, offer engine may notify agents of suggested scripts to server based on trigger event and the agents may request the actual scripts from server 203.

In this case, agent desktop 204 has a current script I, which is a customer service script for a desktop computer, presumably purchased by the customer sometime in the past. The agent may be walking the customer through some technical process or may be helping the customer trouble shoot the system.

During the live interaction, VRE 201 recognizes the keyword "notebook" and the phrase "I am interested" spoken by the customer during the interaction with the agent. The customer may be talking with the agent about a need for a notebook computer while interacting with the agent to solve a problem with the desktop computer the customer already owns. VRE 201 generates a trigger event as a result of the voice recognition and an offer is triggered. CRM data may also be consulted by the offer engine to confirm that the customer has not yet purchased a notebook from the company.

Offer engine 202 receives a script (script II) from script server 203 and serves the script to agent desktop 204. Script II is a new suggested script which describes a special offer on notebook computers the company currently has in stock. VRE 201 may also recognize whether the customer positively responded or negatively responded to presented script II. In this example, VRE 201 recognizes the keywords "Internet", "Telephone", and the phrase "Something Smaller". This recognition may occur after a negative response to the first offer is detected. As a result of the subsequent recognition, a second trigger event is generated and sent to engine 202.

Engine 202 consults one or more rules and determines that an offer N should be presented to the customer. Offer engine 202 receives script N from server 203 and routes script N over the LAN to agent desktop 204 where it appears. Newly suggested script N describes a free smart phone offered by the company with Bluetooth capability, Internet capability, and a 1-year service contract. Service pricing information may also be a part of the script. In this way, VRE continually monitors what the customer says and mines the customer's speech for any specific keywords and/or phrases that may be tied or tagged to specific scripts. Offer engine 202, in this example, may select and forward several scripts to agent desktop 204 during the course of an interaction with a customer. The exact number and order of scripts served during an interaction depends on VRE recognition and consultation with one or more enterprise rules.

Although it is not illustrated in this example, offer engine 204 may alert a supervisor at any time during a live interaction to monitor the call. This state depends on VRE recognition of some mood state defined by one or more keywords, phrases, or voice tone levels detected during the call with the agent or before the call is routed to an agent when the customer is still interacting with an IVR. Certain key words like any curse words, or perhaps a phrase "I am fed up" or the shorter phrase "fed up" could possible trigger an alert to a supervisor to monitor the call. Voice tone level alone may also be associated with an alert event. Voice tone may be determined by decibel, inflection, and other attributes. A sudden elevation in level may trigger an alert.

A combination of voice tone level and keywords or phrasing might be observed before a trigger event for an alert is generated at the VRE. For example, voice tone level may also increase suddenly if the customer becomes excited because of extreme satisfaction, in which case an alert may not be triggered. Mining keywords or phrases from the customer during the voice level increase may help to determine if the customer has become agitated or is simply excited about a new product.

Figure 3:
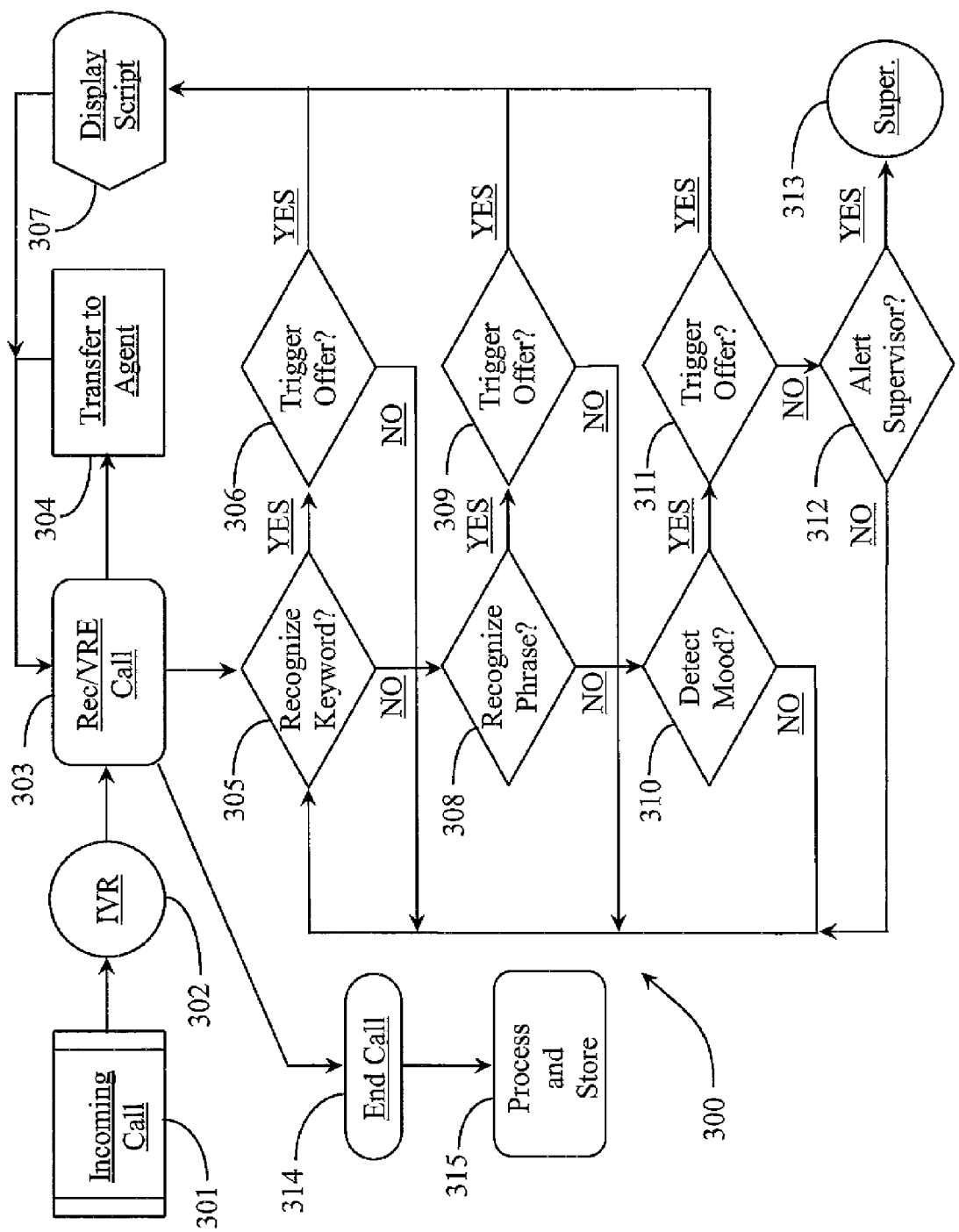
FIG. 3 is a process flow chart illustrating steps 300 for scripting an agent based on recognition of keyword and/or phrase recognition according to an embodiment of the present invention.

FIG. 3 is a process flow chart illustrating steps 300 for scripting an agent based on recognition of keyword and/or phrase according to an embodiment of the present invention. In step 301, an incoming call is registered at the contact center switch. At step 302, the caller is routed to IVR for pre-treatment before internal routing.

At step 303, the CVS system may begin recording the call in order to preserve a record of the call, and a voice recognition engine begins monitoring voice. It is noted herein that preserving a record of the call, which may later be transcribed into text and rendered searchable for reference, is not absolutely required in order to practice the invention. In one embodiment, the VRE is the first line interfacing peripheral instead of a recording system. In another case, recording and voice recognition occur in conjunction with one another as parallel processes.

At step 304, the final destination for the call is determined and the call is routed to an agent. It is noted herein that voice recognition may begin after step 304 is some embodiments. However as further described above there is logical reason for initiating voice recognition at the onset of IVR interaction in part to determine the mood of the customer, which may be apparent before internal routing. An alert to monitor the customer, for example, might be sent to a supervisor before the caller is transferred to an agent. In some cases, pre-transfer mood assessment might be used to transfer the caller to a customer pacification specialist instead of a traditional agent.

In any case, after transfer to an agent in step 304, the process resolves back to step 303 where voice recognition continues. In one embodiment, the voice recognition engine processes the recording of the customer's voice instead of the live voice feed. In this way more than one pass may be made for better accuracy. However, it is important that opportunities and alerts are generated and presented to the customer in a timely fashion, for example, within a very short time frame of a triggered event.

At step 305, the system determines if any specific keywords are recognized that might be associated with an offer. If specific keywords are recognized in step 305, then at step 306 the CVS system determines if an offer (script) should be made to the customer. In one embodiment where only keywords are detected there are no steps for phrase detection. If at step 306, the CVS system determines that a specific offer should be presented, then at step 307 the offer (script) is sent to the desktop of the agent handling the call and displayed for the agent to read to the customer. The process then resolves back to step 303 where recording and voice recognition continue during the call.

If at step no specific keywords are recognized, then at step 308 the system determines if any specific phrases were recognized. In this case the system uses keyword recognition, phrase recognition, and mood detection. If at step 308, one or more specific phrases are recognized that might trigger an offer, then the system makes a determination at step 309 whether or not an offer should be presented. If at step 309, the system determines that an offer should be made, then the process resolves back to step 307 where the offer is sent to the desktop of the agent handling the call and displayed for the agent to read to the customer.

In actual practice of the invention where both phrases and keywords are subject to voice recognition, the order of recognition is irrelevant and in some cases a trigger event may be generated just for one or the other, or for both. In step 308, if the system determines that a phrase was not recognized, then at step 310, the CVS system determines if a specific mood has been detected that might trigger an offer or an alert-to-monitor. If at step 310, the CVS system detects a specific mood defined by an increase in voice tone, then at step 311 the system determines if it will trigger an offer. For example, the mood detected may be one of elevation or excitement, which may be associated with an upsell opportunity. In one case, the mood detected is one of agitation or frustration, which may be associated with an alert-to-monitor.

At step 311 if the system determines that an offer should be presented, then the process resolves back to step 307 and 303 as described above for keyword and phrase recognition. If at step 311, the VS system determines that no offer should be triggered, the system determines at step 312 if a supervisor should be notified or alerted to monitor the call. If at step 312, the system determines that the call should be monitored because of a mood detected such as agitation, for example, then at step 313 a supervisor or other monitoring authority is alerted to monitor the call.

It is noted herein that keyword and phrase recognition along with mood detection occur in actual practice as parallel ongoing processes in a system that leverages all three capabilities. It is possible that a CVS system leverages only keyword recognition. In this case mood detection can be based on keyword recognition of specific keywords. In one embodiment, keyword recognition helps determine if a rise in voice tone is due to excitement or elation in a customer or perhaps agitation and frustration. It is also noted herein that voice tone level change detection is not absolutely required in order to determine mood. Mood detection can be based solely on keyword recognition. Where voice tone level change detection is used, keyword detection is also used in a preferred embodiment to help determine the exact nature of the mood of the customer.

Steps 305, 308, and 310 are ongoing steps that repeat throughout the live interaction. At steps 306 and 309, if the system determines not to make an offer, then the process loops back to repeat the step (continue monitoring). At step 311, if the system decides not to make an offer, and at step 312 the system decides not to alert a supervisor, then the process similarly loops back to continue monitoring. At some point in the process, the call will reach a conclusion, voice recognition and recording will stop and the call will end as illustrated in this process by step 314. At step 315, the contact center may process and store call results including the call recording if one was retained.

Process steps 300 may occur in a different order that illustrated without departing from the spirit and scope of the present invention. For example, steps 305, 308, and 310, as well as step 303 are ongoing during the duration of the interaction. A trigger event may be subject to a further decision whether or not to present a scripted offer. The offer engine may make this determination based on consultation of one or more rules after receiving a trigger event from the VRE.

Figure 4:
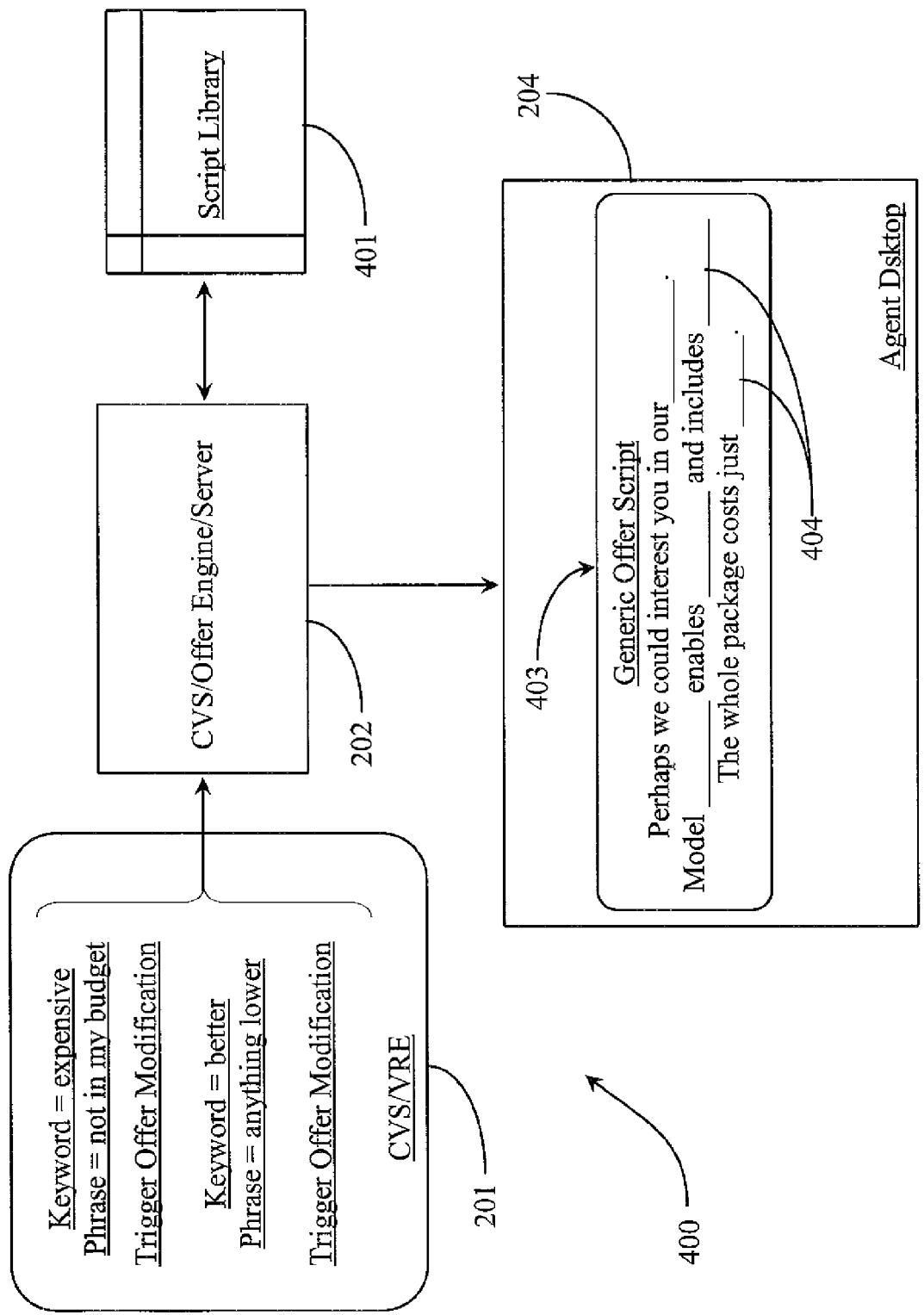
FIG. 4 is a block diagram illustrating agent scripting based on keyword and/or phrase recognition according to another embodiment of the resent invention.

FIG. 4 is a block diagram illustrating agent scripting based on keyword and/or phrase recognition according to another embodiment of the resent invention. CVS 400 includes CVS VRE 201 and offer engine 202 as described further above in FIG. 2. Agent desktop 204 is also illustrated. In this example, a script library is provided that contains keywords and phrasing that can be inserted into a generic script offer or opportunity template. A generic script template is illustrated in this example as generic offer script 403. Offer script 403 contains specific text place holders 404 wherein text from script library 401 may be inserted by the CVS system as a result of a trigger event.

The system operates similarly to the system of FIG. 2 at least at the monitoring end where CVS/VRE 201 monitors the live interaction between the customer and the agent at the switch and detects keywords, phrases, and mood of the customer. In one embodiment, an agent operating desktop 204 may receive an initial offer script to present to the caller at the beginning of the interaction. The generic script 404 may have the initial placeholders populated with text that defines an initial offer to present to the customer. Static text in script 403 is simply text that may be repeated regardless of the nature of the offer, which in this example is defined only by inserted text from script library 401.

In this example, text may be inserted into placeholders 404 of script 403 in order to define a new offer. The inserted text overwriting any text already present in the script marked by the placeholders. It may be assumed in this embodiment that an interaction is underway between an agent operating desktop 204 and a customer, and that an initial offer was presented or read to the customer by the agent from an initial script template 403.

As previously described, the CVS system listens for the result of any offer made and monitors the customer response to the offer in terms of positive or negative reaction to the presented offer. In this example, VRE 201 detects a keyword "expensive" and a phrase "not in my budget". Thus, the reaction to the offer may be determined to be negative mainly due to a pricing concern. Therefore, a new offer modification might be triggered wherein the CVS/VRE sends a trigger event to offer engine 202, which in turn requests and receives lower pricing text and perhaps some different product/service description text and delivery/warrantee information to insert into script 403 overwriting the original data describing the initial offer.

In this case, script 403 has a placeholder for product/service name and product/service model number. A placeholder 404 is illustrated that accepts a text statement describing what the product or service enables (what it does). A next placeholder 404 accepts a text statement listing what accessories the product or service includes. A final placeholder 404 accepts a text statement that specifies the pricing of the product or service. There may be more of fewer placeholders present in generic script 403 without departing from the spirit and scope of the present invention. Moreover, when script 403 is repopulated, one or more of the placeholders may be left blank if the new offer does not require the class of information associated with the particular placeholder.

Perhaps because of a pricing concern, the new text inserted lowers the overall pricing for the same product or service offered to the customer. Perhaps the text inserted describes a less expensive version of the original product or service offered that has a different model number, name and includes a smaller list of accessories.

In this example, CVS/VRE 201 detects the keyword "better" and the "phrase anything lower" and sends another trigger event for offer modification. Offer engine 202 receives the event and makes a determination if an offer should be modified and selects the appropriate new text to insert in the offer. Script library 401 stores the text in organized sets associated to a specific products and/or services. In one embodiment when CVS/VRE sends a trigger event, the event does not guarantee that an offer or offer modification will be made. VRE 201 may send an event describing the keywords, phrases, and mood detected if any and information identifying the interaction participants and agent LAN address. Offer engine 202 is responsible for determining from the information received and from consultation of one or more rules whether to offer a new script or modify an existing generic script. In this example, the VRE detected a failure of the second offer still due to a pricing concern.

Figure 5:
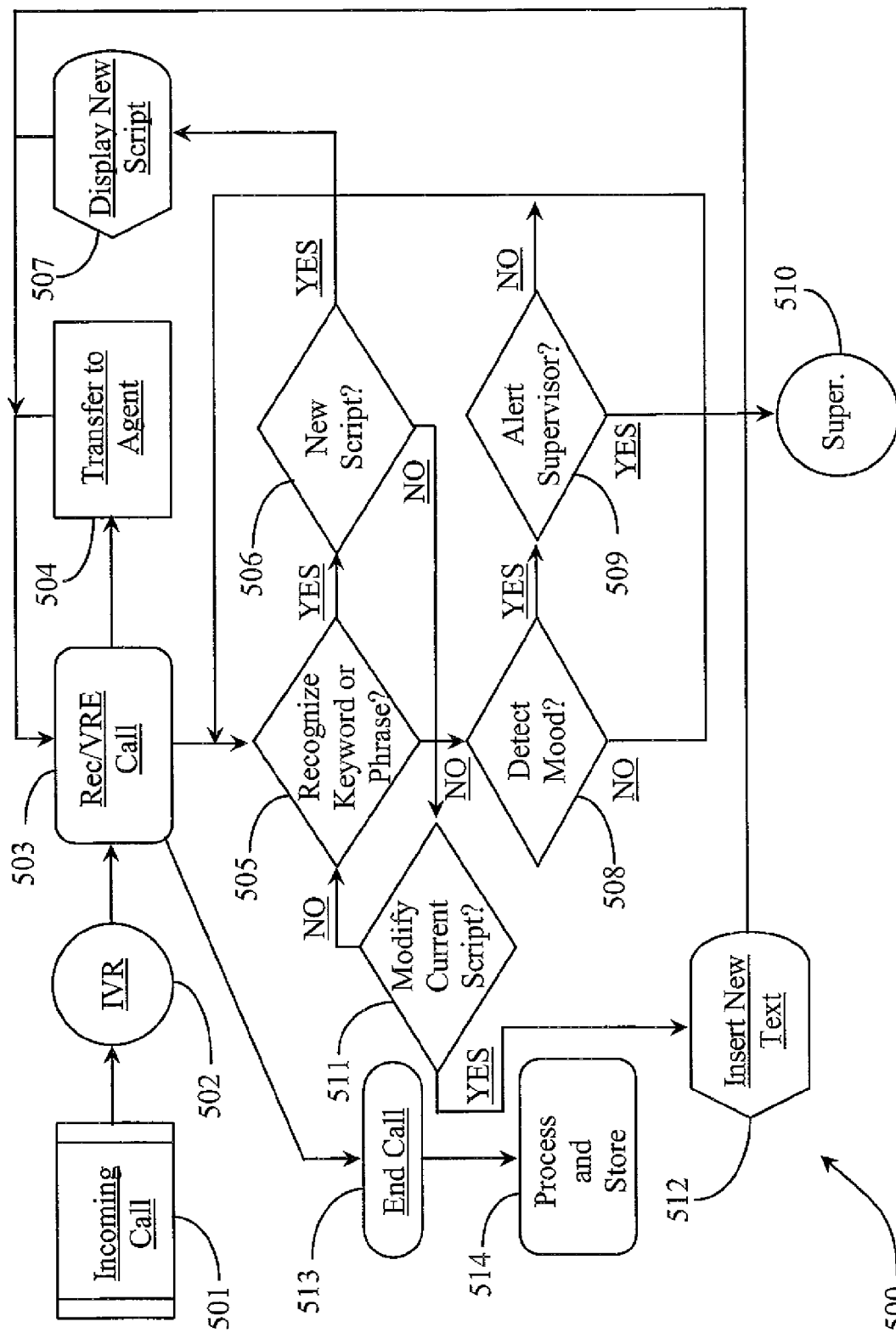
FIG. 5 is a process flow chart illustrating steps 500 for scripting an agent based on keyword and/or phrase recognition according to another embodiment of the present invention.

FIG. 5 is a process flow chart illustrating steps 500 for scripting an agent based on keyword and/or phrase recognition according to another embodiment of the present invention. At step 501, an incoming call is registered at the contact center. At step 502, the call is answered by IVR. At step 503, the call may be recorded and voice recognition may be initiated before final routing is determined.

At step 504, the call is transferred to an agent. The process loop back to step 503, which is an ongoing process running during the entire interaction. At step 504, the CVS system determines if one or more keywords and/or phrases are recognized. If at step 504 keywords and/or phrases are recognized, at step 506, the system determines if a new script will be selected and served. If yes at step 506, then at step 507, the new script is forwarded to the agent desktop and displayed so the agent may present it to the caller. The process then continues back to step 503 and back to step 505.

If at step 506, the CVS system determines that no new script is required, the system determines at step 511 if an existing script should be modified. If at step 511, it is determined that an existing script should be modified, then a step 512, new text is received and inserted into a generic script having placeholders for accepting the inserted text. The process then loops back to step 503. If at step 511 it is determined that no script modification should occur, then the process loops back to step 505, which is ongoing during the entire interaction.

If at step 505 it is determined that no keywords or phrases were recognized, then at step 508, the CVS system determines if a specific mood was detected that might trigger an alert-to-monitor the call. If the system determines at step 508 that a specific mood such as agitation is detected, then at step 509 a notification or alert may be sent to a supervisor or other monitoring authority to monitor the call. At step 510, the supervisor received the alert and patches into the call. Such an alert or notification may contain a number or extension for the supervisor to dial to connect to the call in progress.

At step 508 is the system determines that a specific mood that might trigger an alert is not detected, then the process loops back to step 505 and repeats. It is possible that detection of a specific mood might trigger a scripted offer or an offer modification instead of a supervisor notification to monitor the call. In that case decision steps 506 and 511 may occur before step 509. At step 509 if it is determined that an alert is not required then the process loops back to step 505. Step 503, 505, and 508 are ongoing processes running in parallel during the entire interaction unless they are switched off or terminated for some reason. At some point during the interaction, the caller's goal will be satisfied and the call will end. The call may end at step 513 and the recorded version of the call and any call results may be processed and stored at step 514.

In process 300, the system is enabled to serve a completely new script and to serve a script modification (text inserted into a template). In this embodiment, a new script may be a generic template with appropriate placeholders and the new script then becomes the existing script which may also be subject to script modification. There may be several different generic scripts that can be modified by inserting text, the inserted text overwriting what was previously populated into the template placeholders.

The system and methods of the present invention can be practiced with calls coming in from the Internet and/or any connected sub-network or telephone network. It is not specifically required that callers interface with an IVR. The invention may be practiced using a switch monitoring interface. Recording may capture both what a customer says and what an agent says. Voice recognition and mood detection may be extended beyond the customer to include the agent handling the call. For example, if an agent becomes irate and a negative mood is determined for that agent an alert may be raised to monitor the call even though the customer might not be negatively affected.

In some cases, keywords or phrases spoken by the agent but not by the customer may be taken into consideration when deciding if an opportunity will be selected and presented to the customer. It will be apparent to one with skill in the art that the CVS system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A customer contact center system for facilitating live voice interaction between a customer and a contact center agent, comprising:
   a telephony-enabled device configured to receive voice calls from customers;
   a voice recognition engine connected to the telephony-enabled device and configured to monitor a voice channel;
   a library of scripts which represent offers for a product or service;
   a customer relations management server comprising customer information for a plurality of customers; and
   an application server connected to the voice recognition engine and the customer relations management server, said application server comprising an offer engine;
   wherein the offer engine is configured to
   select a script representing an offer for a product or service from said library based upon customer information provided by said customer relations management server in combination with a detection of one or more of keywords, phrases, tones or combinations thereof on the voice channel,
   deliver the selected script to the agent such that the agent may read the script to the customer, and
   upon detection by the voice recognition engine on the voice channel of one or more keywords, phrases, voice tones or combination thereof indicative of the customer's reaction to the offer represented by the script, modify the script or select and deliver a new script such that the modified or new script may be read by the agent, wherein the modified or new script represents a new offer for a product or service.

2. The customer contact center system of claim 1, further comprising a rules database wherein the offer engine is configured to consult the rules database in order to determine whether or not to select and deliver to an agent a script from said library of scripts, said rules database defining when a script should be selected, which script should be selected for delivery to an agent, and when a script should be modified or a new script selected.

3. The customer contact center system of claim 2, wherein the application server is further configured to send an alert to a supervisor that a live interaction between a customer and an agent should be monitored based upon a detection of one or more keywords, phrases, tones or combination thereof on the voice channel.

4. The customer contact center system of claim 1, wherein one or more of the scripts in said library comprise template scripts which include text placeholders, and further wherein said offer engine is configured such that, upon detection of one or more keywords, phrases, voice tones or combination thereof by the voice recognition engine in response to the reading of the template script by the agent, the offer engine causes text to be inserted into one or more of said text placeholders such that a modified script may be read by the agent.

5. A computer-implemented method for facilitating live voice interaction between a customer and a contact center agent comprising the steps:
   (a) monitoring a voice channel of a conversation between a customer and a contact center agent using a voice recognition engine;
   (b) upon detection of one or more keywords, phrases, voice tones, or combination thereof by the voice recognition engine, consulting a rules database, by an offer engine, to determine whether or not the detected keywords, phrases or voice tones trigger the selection of a pre-written script from a library of scripts, wherein said scripts represent offers for a product or service;
   (c) serving a pre-written script selected in step (b) to the agent such that the agent may read the script to the customer;
   (d) continuing to monitor the voice channel;
   (e) upon detection of one or more keywords, phrases, voice tones or combination thereof by the voice recognition engine indicative of the customer's reaction to the offer represented by the script, consulting the rules database, by the offer engine, to determine whether or not the detected keywords, phrases or voice tones trigger modification of the previously selected script or the selection of a new pre-written script;
   (f) modifying the script served in step (c) or serving a new script to the agent, as determined in step (e), such that the agent may read the modified or new script to the customer, wherein the modified or new script represents a new offer for a product or service; and
   (g) repeating steps (d)-(f) while the customer and agent are engaged in live interaction; wherein steps (b)-(c) and (e)-(f) are performed by an application server.

6. The method of claim 5, further comprising the steps of:
   consulting a rules database to determine whether or not detected keywords, phrases, voice tones, or combination thereof trigger notification of a supervisor; and
   upon a determination that detected keywords, phrases or voice tones trigger notification, sending an alert to a supervisor that the live interaction between the customer and agent should be monitored.

* * * * *